United States Patent [19]

McJunkin et al.

[11] Patent Number: 5,553,880
[45] Date of Patent: Sep. 10, 1996

[54] ENERGY-ABSORBER FOR A BICYCLE FRAME

[76] Inventors: Mark P. McJunkin, 3846 Ridge Ave., Macon, Ga. 31204; H. P. McJunkin, Jr., 862 Alta Rd., Charleston, W. Va. 25314

[21] Appl. No.: 354,050

[22] Filed: Dec. 6, 1994

[51] Int. Cl.⁶ .................................................. B62K 3/02
[52] U.S. Cl. ........................ 280/283; 280/227; 280/275; 280/226.1; 267/131
[58] Field of Search ...................... 280/283, 287, 280/220, 275, 278, 226.1, 227; 267/131, 132, 133; 248/601, 623, 622, 631, 600, 578, 561; 297/211, 195.1, 209, 215.13, 344.19, 344.20

[56] References Cited

U.S. PATENT DOCUMENTS

| | | | |
|---|---|---|---|
| 461,191 | 10/1891 | Latta | 280/227 |
| 578,326 | 3/1897 | Fox | 280/227 |
| 584,944 | 6/1897 | Little. | |
| 589,328 | 8/1897 | Barton | 280/227 |
| 602,354 | 4/1898 | Ohlgart | 280/227 |
| 612,337 | 10/1898 | Hall | 280/227 |
| 635,964 | 10/1899 | Horn | 280/227 |
| 636,726 | 11/1899 | Hindmarsh. | |
| 677,079 | 6/1901 | Pierce et al. | 280/227 |
| 724,630 | 4/1903 | Tramburg | 280/227 |
| 988,181 | 3/1911 | Escalante et al.. | |
| 1,573,849 | 2/1926 | Nagot | 280/227 |
| 2,623,573 | 5/1951 | Gaetano. | |
| 2,856,982 | 10/1958 | Leja. | |
| 4,807,855 | 2/1989 | Schuitema | 267/64.12 |
| 5,024,412 | 6/1991 | Papp. | |
| 5,094,424 | 3/1992 | Hartway | 280/283 |
| 5,158,268 | 10/1992 | Schnitzius et al. | 188/300 |
| 5,320,375 | 6/1994 | Reeves et al. | 188/319 |
| 5,324,059 | 6/1994 | Bryne | 280/283 |
| 5,326,119 | 7/1994 | Ganoung | 280/275 |
| 5,382,039 | 1/1995 | Hawker | 297/344.2 |
| 5,383,705 | 1/1995 | Voigt | 248/622 |

OTHER PUBLICATIONS

1995 Cannondale Bicycle Catalog.

*Primary Examiner*—Douglas C. Butler
*Attorney, Agent, or Firm*—James Creighton Wray

[57] ABSTRACT

An energy-absorbing apparatus for a bicycle frame maintains critical spatial relationships by allowing the seat and the pedal assembly to move slightly, together as a unit, relative to the bicycle frame proper. A telescoping portion of the apparatus has an inner tube housed inside an outer tube. The inner tube has a seat post connected to its top end and a pedal crank axle housing connected to the bottom end. The outer tube is in a fixed, integral relationship with the other frame members. Any of a number of combinations and variations of adjustable spring/damper means isolate the inner tube from the outer tube. Numerous features, including dust boots and a rider-activated keyway lock, can be incorporated into the frame design. The telescoping design reduces impact forces without causing undesirable changes in frame geometry or undesirable changes in the distance between the seat and pedals. The energy absorbing bicycle frame reduces rider fatigue and increases rider control and comfort by allowing controlled movement of the seat and pedals up and down as a unit.

17 Claims, 5 Drawing Sheets

ENERGY-ABSORBER FOR A BICYCLE FRAME

BACKGROUND OF THE INVENTION

The present invention relates generally to energy-absorbing apparatus for bicycles.

In recent years, mountain bike suspension devices have expanded in variation and complexity, generating widespread interest and acceptance. Competitors in the sport need bicycle frames that reduce forces on the bike and shock to the rider. Off-road conditions increase the physical demands on a rider's body, thereby speeding fatigue and increasing discomfort. Needs exist for energy-absorbing apparatus for bicycles that reduce rider discomfort and fatigue and lessen frame loads.

Existing suspension devices have proven problematic. State-of-the-art suspension units fail to maintain the basic bicycle geometry. Critical spatial relationships, such as the distance between the seat and the pedals and frame angles relative to the wheelbase, are sacrificed in efforts to enhance comfort and reduce frame loads and rider fatigue. Current bicycle frames use rear wheel suspensions for absorbing energy. Rear wheels are trailing linked and sprung such that the wheels change relative to the static geometry of frame and wheel assemblies when energy is absorbed. Seats may be sprung relative to the frames, but that results in undesirable seat/pedal distance variations. Other suspension designs, such as flex-stem handlebars, strut-type energy absorbing forks, and flex frames, are hindered by similar critical relationship flaws.

Needs exist for bicycle frames that do not compromise critical geometry when suspension devices are incorporated. Since weights of riders are typically six times that of bicycles, frequent and abrupt suspension movements and subsequent changes in bicycle geometry can decrease rider control. Suspension systems that eliminate or substantially limit changes in the critical relationships of bicycle components are needed to enhance control.

Suspensions need to be simple, sturdy and not susceptible to failure. Since off-road conditions are not constant, needs exist for suspension devices that are adjustable and easily controlled by riders. Energy-absorbing mechanisms need to be compatible with conventional frame configurations and adaptable to newly designed lightweight frames.

SUMMARY OF THE INVENTION

New energy-absorbing apparatus for bicycle frames permit seat and pedal assemblies to maintain a fixed spatial relationships with each other while moving as units relative to bicycle frames. The present invention reduces shock to the rider and forces on the bicycle while not causing any significant change in the basic frame geometry. The seat and the pedal crank axle housing move vertically together as a single unit, thus maintaining the dimensional relationship between the two components. That allows for suspension action without altering the critical geometrical relationships of the bicycle. Frames can be both strong and lightweight, providing enhanced control.

The present invention has a telescoping portion that forms part of the bicycle frame. Preferably, that portion has an outer tube that houses a close-fitting inner tube to which a seat and a pedal crank axle housing are mounted. The outer tube is a fixed part of the frame. The remainder of the bicycle frame members are connected to the outer tube. The outer tube and the inner tube are coupled such that movement of the seat and pedals, and hence movement of the inner tube, is damped by connectors to the rest of the frame. The seat and the pedal crank axle housing maintain the same spatial relationship and move, if at all, as a unit. That results in movement of the inner tube relative to the outer tube and the rest of the frame.

Numerous variations and combinations of springs and dampers for coupling the inner tube and the outer tube are possible. Some embodiments have single springs or dampers positioned at the top of the telescoping portion underneath the seat. Other embodiments have single springs or dampers, or a combination of springs and dampers, positioned around the middles of the telescoping units. Other embodiments of the energy-absorbing apparatus have a combination of springs and dampers positioned at both the tops and the bottoms of the telescoping unit. That provides for two-way centering.

The energy-absorbing apparatus is rugged, adjustable and compatible with existing conventional bicycle frame configurations and suspension devices. The telescoping suspension also allows for lighter frame structures. Cross-sectional shapes of the inner tube and the outer tube may prevent rotation relative to each other. External stabilizers can be incorporated to prevent rotation. Accessories, such as dust boots, can be added to enhance the quality and operation of the apparatus. Similarly, features such as keyway locks or force adjusters can be incorporated to give riders increased control over the suspension systems.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
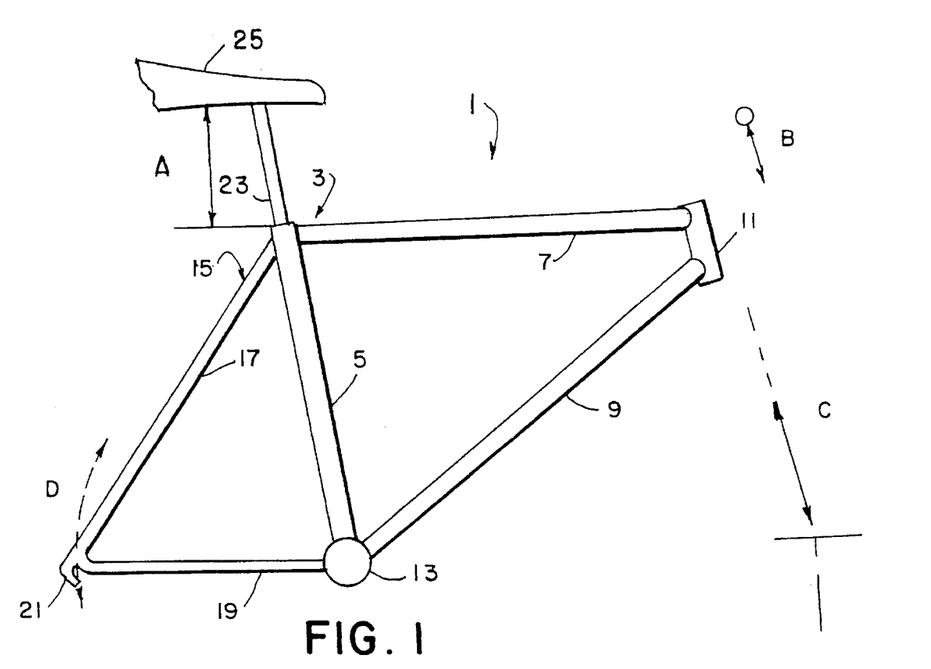
FIG. 1 shows a conventional bicycle frame with conventional trusses.

Referring to the drawings, an energy-absorbing apparatus compatible with conventional bicycle frames, such as shown in FIG. 1, maintains critical spatial relationships when suspension is active. FIG. 1 shows a conventional diamond bicycle frame 1 with three conventional trusses. A main frame 3 is made of the seat tube 5, the top tube 7, the down tube 9, and the front fork-receiver tube or head tube 11. A bracket 13 is connected to the lower ends of the seat tube 5 and the down tube 9 to hold the bearings for the foot cranks. Two generally parallel rear trusses or rear forks 15 are formed at the back of the seat tube 5. The rear forks 15 have rear stays 17 which extend downward and chain stays 19 which extend rearward to rear wheel hub receivers 21. A seat post 23 adjusts in length by clamping the seat post 23 in the open top of the main tube 5. A saddle 25 clamps to the upper part of the seat post 23. Modern suspension movement alternatives are added to off road or "mountain" bikes. For example, in area A the seat may be sprung relative to the frame; in area B, the handle bars may be translatably linked to move relative to the frame; in area C, the front forks can be adjustably sprung; and in area D, the rear wheel can be trailing linked and sprung. Prior art embodiments of those suspension movement alternatives reduce control by destabilizing geometric relationships.

Figure 2:
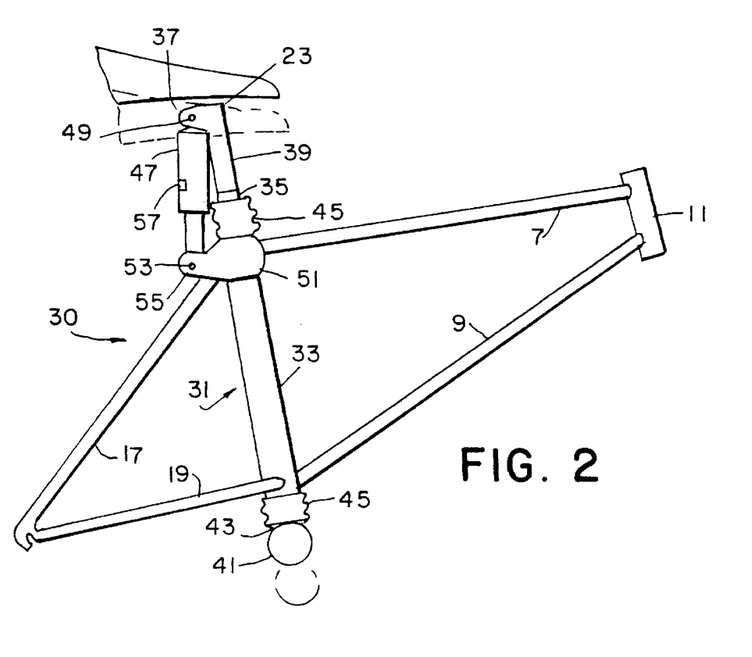
FIG. 2 shows a preferred embodiment of the present invention, demonstrating how changes in the static geometry of the bicycle frame, wheel position, seat, and pedal crank axle housing are minimized as energy is dissipated.

Unlike existing bicycle suspension devices, the present invention reduces shock to the rider and forces on the bicycle frame without causing any significant change in the basic frame geometry. As shown in FIG. 2, the present invention 30 has a main telescoping portion 31. That portion 31 comprises a non-round outer tube 33 that houses a close-fitting, complimentary inner tube 35. A seat post 23 of a bicycle seat 25 is mounted by a clamping bracket 37 to a top end of a transition tube 39 which connects to the inner tube 35. A pedal crank axle housing 41 is mounted at a bottom end of the inner tube 35. The remaining members, including the chain stays 19, the rear stays 17, the top tube 7, and the down tube 9, of the bicycle frame 30 are connected directly or through brackets to the outer tube 33. The outer tube 33 and the inner tube 35 are coupled such that movement of the seat 25 and crank housing 41, and hence movement of the inner tube 35, are damped by the rest of the frame. Thus, the seat 25 and pedal crank axle housing 41 maintain the same spatial relationship and move as a unit, which results in movement of the inner tube 35 relative to the outer tube 33. Spring suspension of the major mass, the rider seat 25 and cranks is accomplished without significant frame and wheel distortions by interconnecting the seat 25 and pedal crank housing 41 with a spring mounted telescoping inner tube 35. Dust covers or boots 45 are provided where the inner tube 35 emerges from the outer tube 33. An fluid cylinder 47, such as an air cylinder, is connected to pivot 49 on the upper bracket or clamping bracket 37 on the transition tube 39. A main bracket 51 on the upper end of the outer tube 33 receives ends of the top tube 7 and rear stays 17. A pivot 53 on a rear extension 55 of the main bracket 51 holds a lower end of the air cylinder 47. A lock 57 on the fluid cylinder 47 side walls prevents relative movements of its parts and thereby prevents translation of the inner tube 35 within the outer tube 33.

Figures 3, 4, 5:
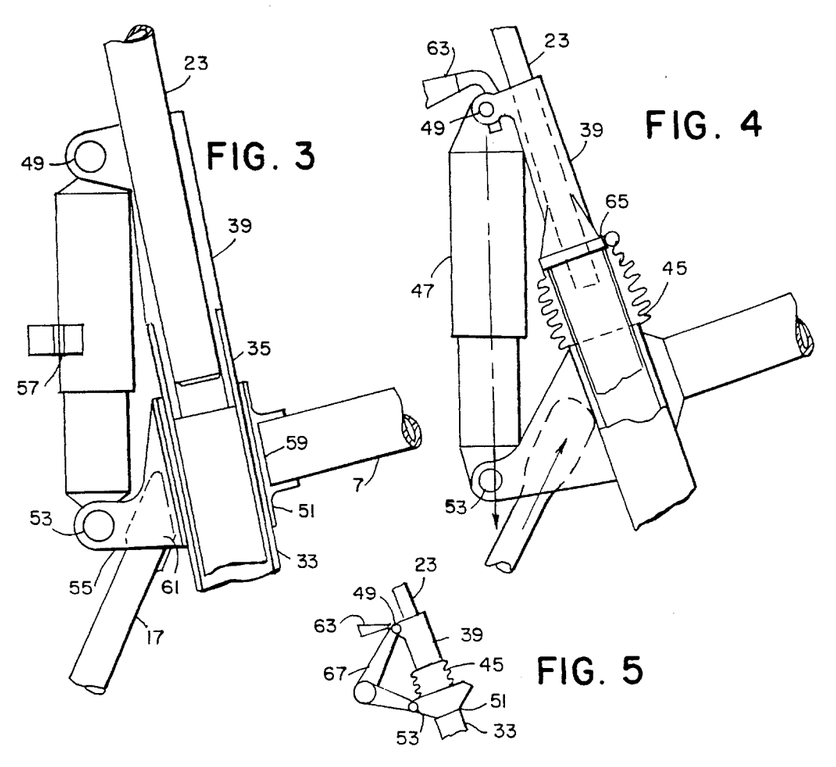
FIG. 3 is a detail of the embodiment of the present invention shown in FIG. 2 having the inner tube and the outer tube coupled by an air cylinder.
FIG. 4 is a detail of the embodiment of the present invention shown in FIG. 2 having a clamp and a dust cover.
FIG. 5 is a detail of a FIG. 3 or 4 embodiment having a knuckle linkage torsion spring for coupling the inner tube to the outer tube.

FIG. 3 shows a detail with the dust boot 45 having been removed. The rear end of the top tube 7 is held in a receiver 59 which extends from the main bracket 51. Rear receivers 61 hold the tops of the rear stays 17.

As shown in FIG. 4 the pivot 49 is the clamping pin on which the clamp lever 63 is mounted. Clamp bands 65 hold dust cover 45 in place.

FIG. 5 shows an adjustable torsion spring knuckle 67 with a compression elastomer that replaces the air cylinder 47.

Figures 6, 7:
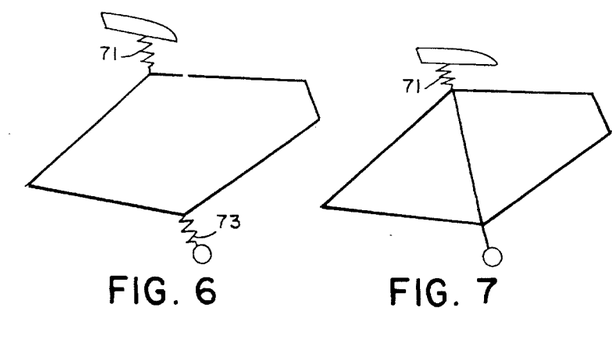
FIG. 6 schematically shows an embodiment of the spring/damper having two-way centering with a spring or a damper at both the top end and the bottom end of the telescoping portion.
FIG. 7 schematically shows an embodiment of the spring/damper having one-way non-centering with a spring or a damper positioned at the top end of the telescoping unit beneath the seat.
Figure 6:
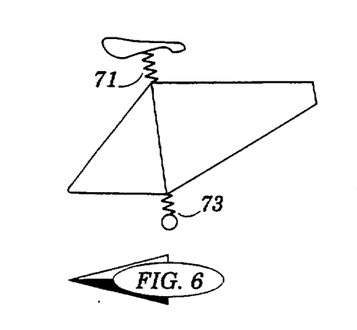
Figure 7:
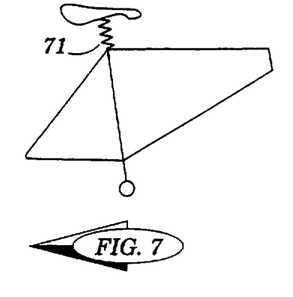
Figure 8:
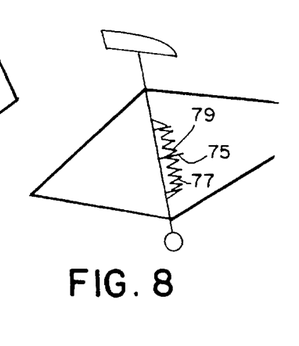
FIG. 8 schematically shows an embodiment of the spring/damper means having the spring/damper combination positioned in the middle of the telescoping unit.
Figures 14, 15, 16, 17, 18, 19, 20:
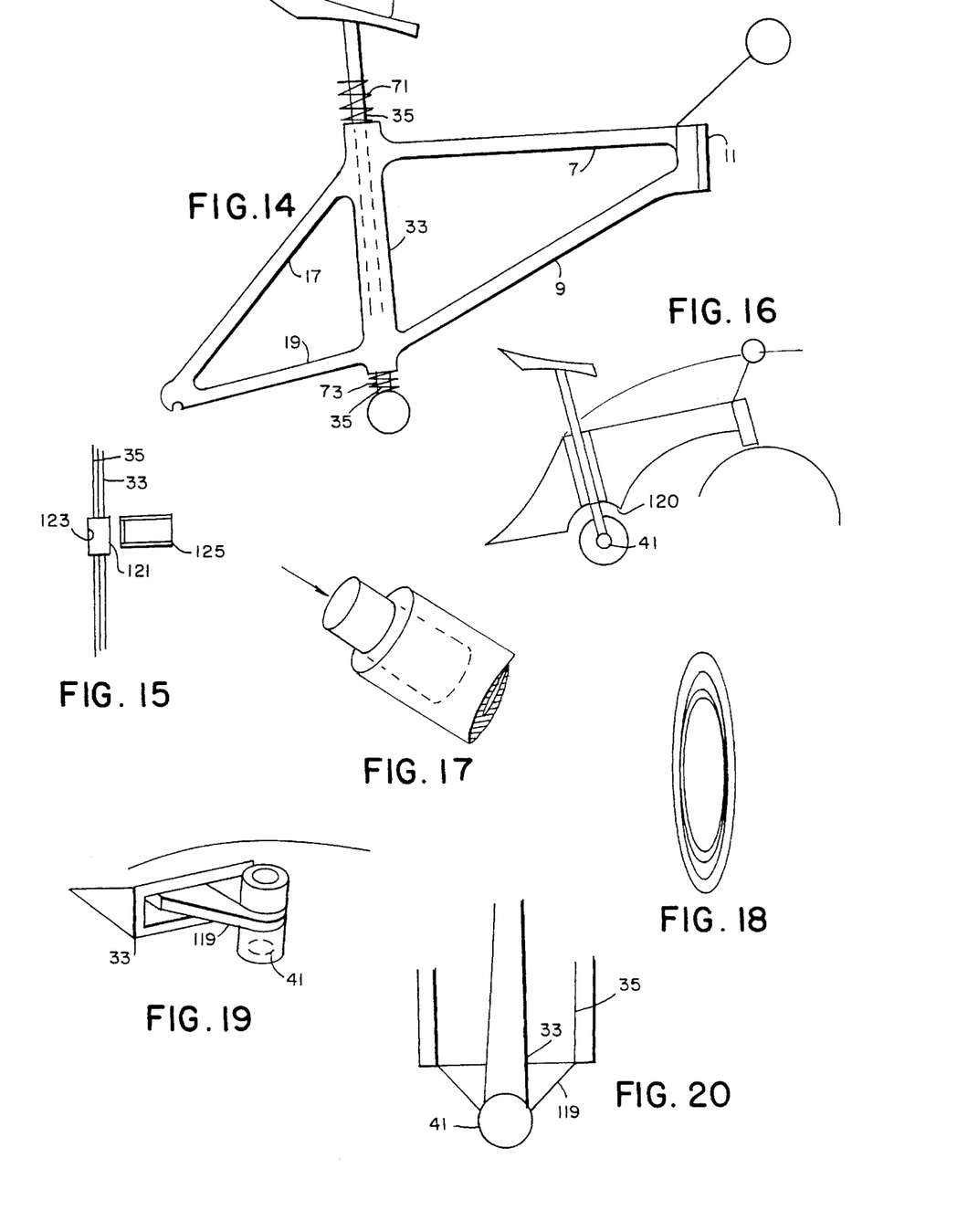
FIG. 14 schematically shows a preferred embodiment of the present invention having a combination of springs and dampers positioned at both the top of the telescoping unit underneath the seat and at the bottom of the telescoping unit above the pedal crank axle housing.
FIG. 15 shows the embodiment of FIG. 14 having a keyway lock for deactivating the suspension system.
FIG. 16 shows an embodiment of the energy-absorbing apparatus having directionally contoured telescoping elements for inhibiting twisting of the pedal crank axle housing and a lightweight frame.
FIG. 17 is a detail of the present invention having tube sections that are oval.
FIG. 18 is a cross-sectional detail of the embodiment shown in FIG. 17.
FIG. 19 is a detail of a sliding support plate as twist-inhibiting element.
FIG. 20 is a cross-sectional detail of the twist inhibiting sliding support plate shown in FIG. 19.
Figures 14, 15, 16, 17, 18:
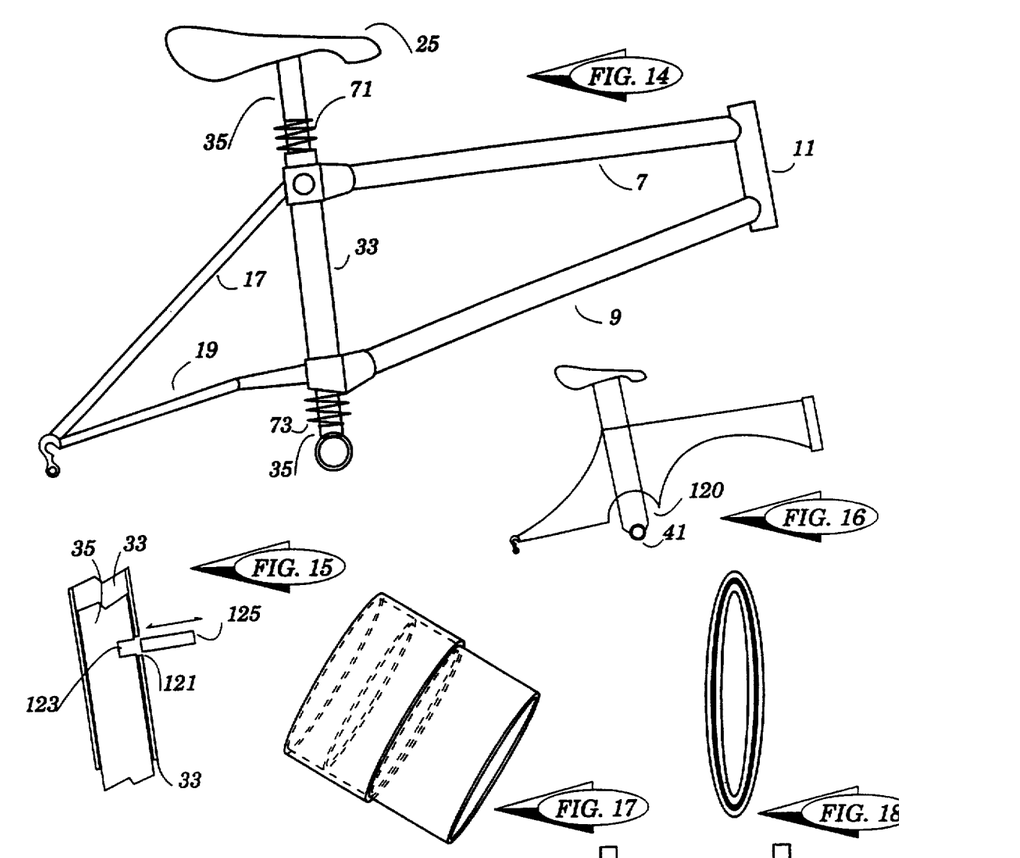
Figure 19:
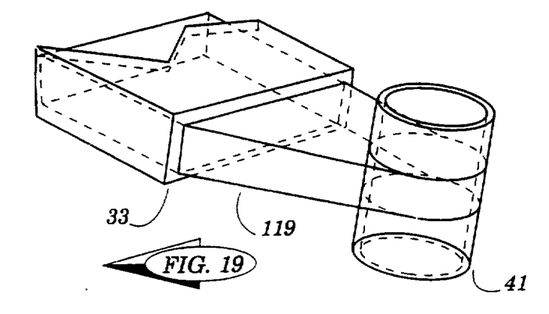
Figure 20:
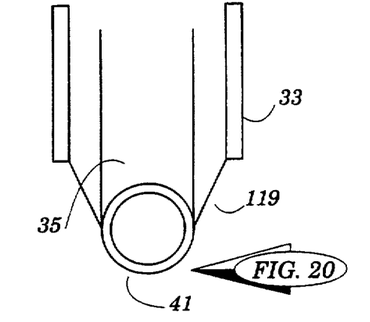

There are numerous ways to couple the inner tube to the outer tube while still maintaining the static geometry of the bicycle frame as energy is dissipated. FIGS. 6–8 show variations for the placement of the spring/damper of the present invention. In FIG. 6, a modified FIG. 2 embodiment of the energy-absorbing apparatus uses a pair of springs or dampers 71 and 73. One spring or damper 71 is positioned at the at the top end of the telescoping portion below the seat. A second spring or damper 73 is positioned at a bottom end of the telescoping portion, above the pedal crank axle housing. Similar centering is accomplished by extending an extension 75 of the inner tube 35 between spring/dampers 77 and 79 which are anchored to the outer tube 33, as shown in FIG. 8. Those configurations create two-way centering of the inner tube in the bicycle frame. FIG. 14 schematically illustrates how all critical angles and spatial relationships, including seat-to-pedal distances, remain unchanged when the new suspension is active. Hand to seat distances change, but it is normal to flex and extend arms with typical upper body movements.

As shown in FIG. 7, a single spring or damper 71, such as shown in FIGS. 2–5, can be the coupling. The single spring or damper is positioned at the top end of the telescoping portion beneath the seat. A second embodiment, which is a modified form of FIG. 6, is shown in FIG. 8. A single spring or damper, or a combination of springs or dampers, are positioned in the middle of the telescoping portion. The couplers are connected between a plate connected to the inner tube and a plate connected to the outer tube.

Figure 9:
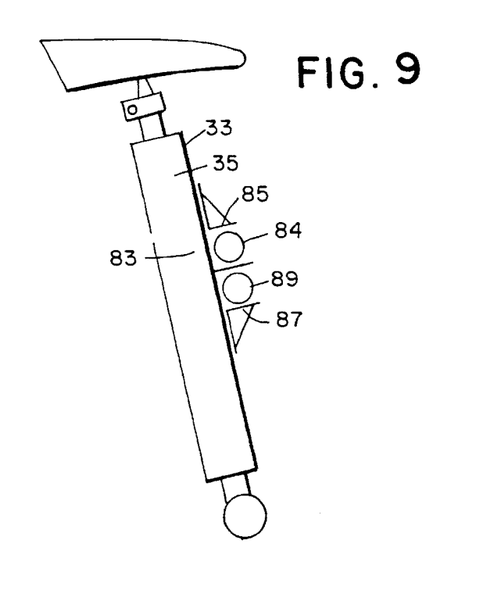
FIG. 9 is a detail of a FIG. 8 embodiment of the energy-absorbing device having an inner tube, an outer tube, a slot positioned in the outer tube, a plate connected to the inner
Figure 10:
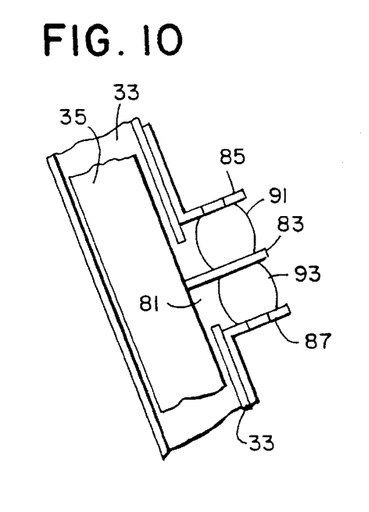
FIG. 10 is an enlarged detail of the device shown in FIG. 9, having elastomer springs.

FIGS. 9 and 10 are details of the embodiment shown in FIG. 8 wherein the inner tube 35 and the outer tube 33 are coupled together near their centers, as opposed to at their ends. A slot 81 is positioned in the outer tube 33, thereby exposing the underlying inner tube 35. A first plate 83 is fixed to the inner tube 35 and extends through the slot 81 in the outer tube 33. A second plate 85 and a third plate 87 are connected to the outer tube 33 near the edges of the slot 81 and extend outward from the outer tube 33 parallel to the first plate 83. Preferred embodiments of the present invention have the second plate 85 and the third plate 87 adjustably fixed to the outer tube 33 for permitting preload adjustment of the couplers 89. Various combinations of springs and dampers can be connected to the plates, thereby allowing the inner tube 35 to move relative to the outer tube 33 and maintaining the critical spatial relationships of the bicycle when suspension is active.

Figure 11:
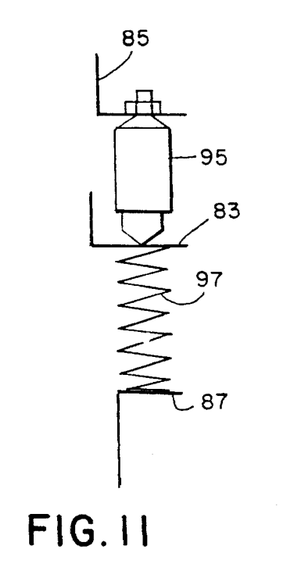
FIG. 11 shows a FIG. 8 embodiment with a spring/damper combination having a damper and an adjustable preloaded spring.
Figure 12:
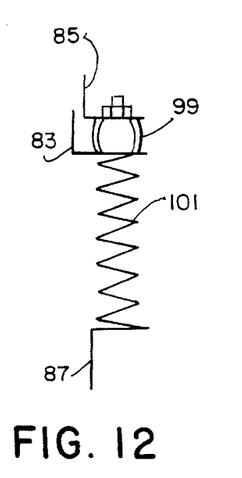
FIG. 12 shows a FIG. 8 embodiment with a spring/damper combination having an elastomer centering spring and an adjustable preloaded spring.

In FIG. 10, elastomer springs are used to couple the inner tube 35 to the outer tube 33. A first elastomer spring 91 extends from the top of the first plate 83 to the second plate 85. A second elastomer spring 93 extends from the bottom of the first plate 83 to the third plate 87. In FIG. 11, a spring and a damper are employed as the couplers. A damper 95 extends from the top of the first plate 83 to the second plate 85. An adjustable preloaded spring 97 extends from the bottom of the first plate 83 to the third plate 87. In FIG. 19, an elastomer spring 99 and an adjustable preloaded spring 101 are used as the coupling means. The elastomer centering spring 99 extends from the top of the first plate 83 to the second plate 85. An adjustable preloaded spring 101 extends from the bottom of the first plate 83 to the third plate 87. The third plate 87 is adjustably mounted to permit preload adjustment of the spring 101.

Figure 13:
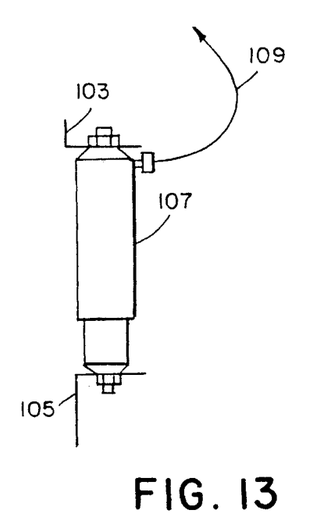
FIG. 13 is a detail of an air cylinder extending between the inner tube and the outer tube.

FIG. 13 shows an embodiment of the invention disclosed in FIG. 9 having an air cylinder as the coupler. A first bracket 103 is connected to the inner tube 35 and a second bracket 105 is connected to the outer tube 33. The second bracket 105 can be adjustably mounted. An air cylinder 107 extends between the brackets 103 and 105, and is connected at its top to the first bracket 103 and at its bottom to the second bracket 105. An air line 109 can extend from the air cylinder to a hand pump on the handle bars.

Figure 21:
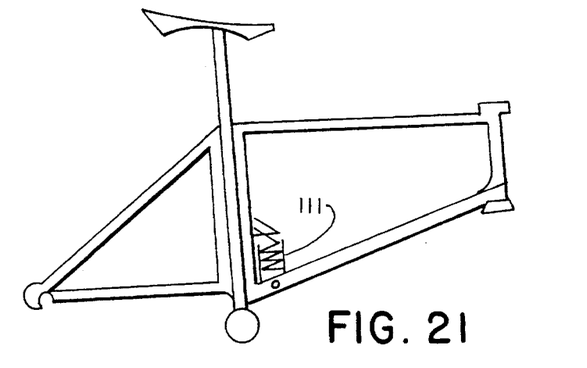
FIG. 21 shows a forward mounted spring shock.
Figures 21, 22, 23, 24:
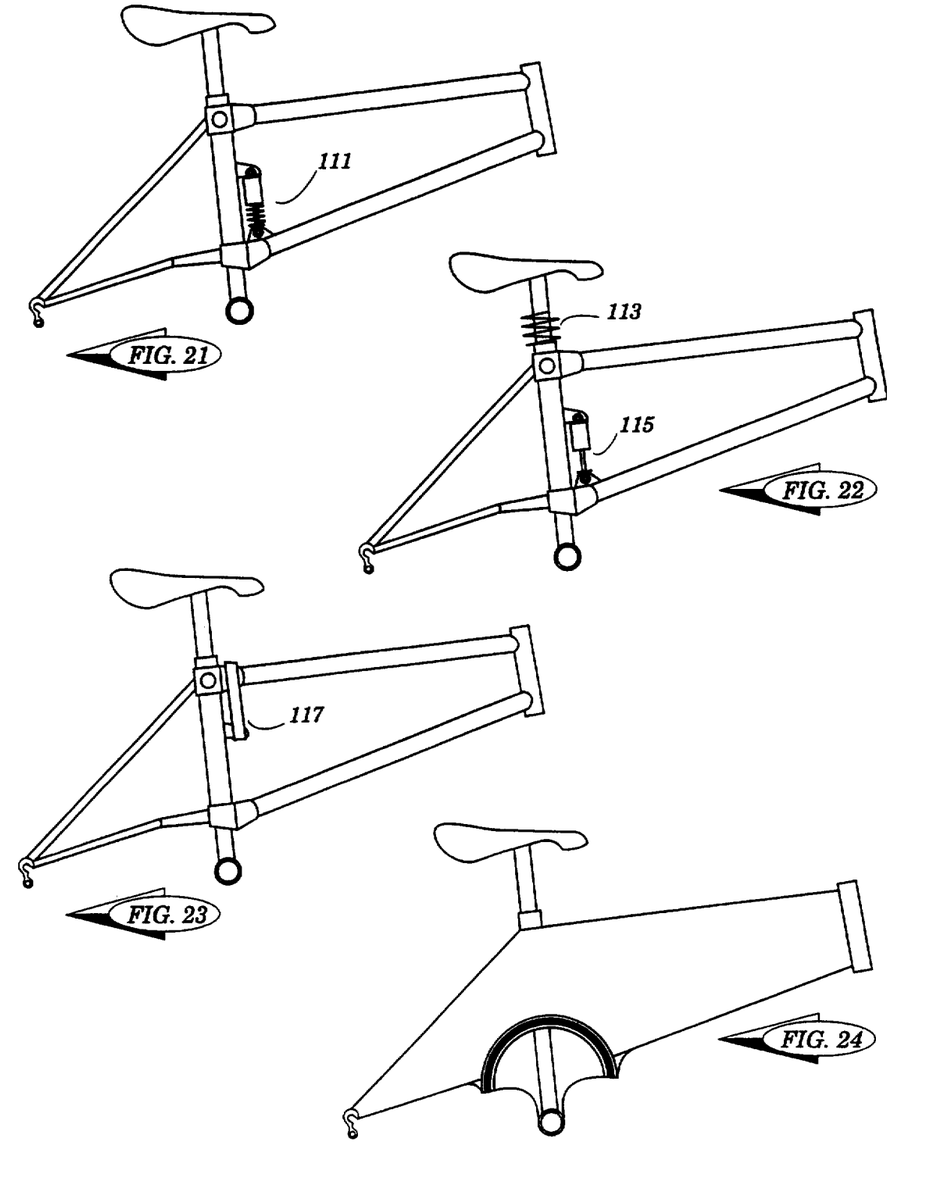
FIG. 22 shows a similar spring/dampener combination.
FIG. 23 shows a tension spring.
FIG. 24 shows a telescoping embodiment of the present invention with elastomer isolation.
Figure 22:
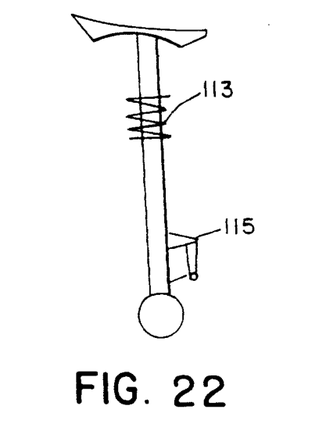
Figure 23:
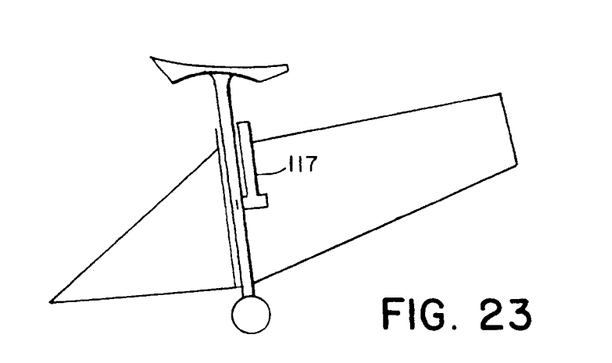
Figure 24:
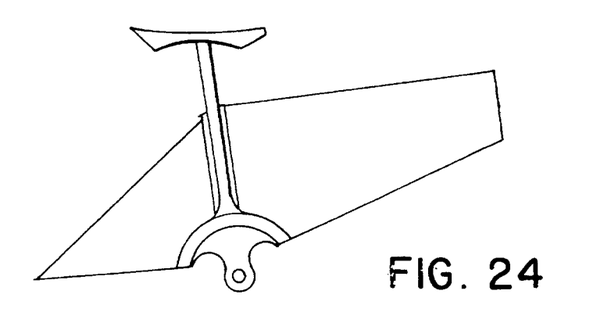

FIGS. 21–24 show a few of the possible couplers for the present invention. FIG. 21 shows a forward-mounted spring shock 111 as the coupler. FIG. 23 uses a tension spring 117 as the coupler. FIG. 22 shows an embodiment wherein a spring 113 is positioned at the top end of the telescoping portion of the present invention and a damper 115 is positioned at the lower end. FIG. 24 shows a telescoping embodiment of the present invention with elastomer isolation.

The inner tube and the outer tube can have any combination of cross-sectional shapes that prevent rotation of the tubes relative to each other. Possible embodiments include inner tubes and outer tubes having rectilinear, oval, or triangular shapes, or any combination thereof. FIGS. 17 and 18 show possible tube sections. Rotation of the tubes can also be eliminated by using an external stabilizer. One possible stabilizer is a sliding support plate, as shown in FIGS. 19 and 20. The sliding support plate 119 extends around the bottom end of the inner tube 35 and engages the pedal crank axle housing 41 to inhibit twisting. Circular shaped tube sections can be used when an external stabilizer is employed. FIG. 16 shows an embodiment of the present invention having sliding, directionally-contoured telescoping elements 120 for inhibiting twisting of the pedal crank axle housing 41.

The present invention is designed so as to allow a rider to turn off the suspension by locking the movement of the inner tube. One embodiment of a locking mechanism is shown in FIG. 15. An opening 121 is positioned in the outer tube 33. A notch 123 is positioned in the inner tube 35. To lock the suspension system, a keyway lock 125 is extended through the opening 121 in the outer tube 33 and into the notch 123 of the inner tube 35. The keyway lock 125 engages the sides of the notch 123 and prevents movement of the inner tube 35 and the outer tube 33.

While the invention has been described with reference to specific embodiments, modifications and variations of the invention may be constructed without departing from the scope of the invention, which is defined in the following claims.

We claim:

1. An energy-absorbing bicycle apparatus comprising a bicycle frame, a telescoping portion and at least one resilient coupler, the telescoping portion further comprising an outer tube, an inner tube housed inside and coupled to the outer tube, the inner tube having a top end and a bottom end, a seat post connected to the top end and a crank axle housing connected to the bottom end, the outer tube mounted in the bicycle frame, and wherein the coupler joins the inner tube and the outer tube such that movement of the inner tube, the seat post and the crank axle housing is damped relative to the frame proper and such that the seat post and the crank axle housing maintain a constant spacial relationship and move as a unit, wherein the coupler further comprises an air cylinder, the air cylinder having an upper portion and a lower portion, the upper portion connected to the inner tube and the lower portion connected to the outer tube.

2. The apparatus of claim 1, further comprising a main bracket connected to and positioned around the outer tube, and wherein a top tube of the bicycle frame is connected to the main bracket and seat stays of the bicycle frame are connected to the main bracket.

3. The apparatus of claim 1, further comprising a first collapsible dust boot positioned around the inner tube at the top end where the inner tube emerges from the outer tube.

4. The apparatus of claim 3, further comprising a second collapsible dust boot positioned around the inner tube at the bottom end where the inner tube emerges from the outer tube.

5. An energy-absorbing bicycle apparatus comprising a bicycle frame, a telescoping portion and at least one resilient coupler, the telescoping portion further comprising an outer tube, an inner tube housed inside and coupled to the outer tube, the inner tube having a top end and a bottom end, a seat post connected to the top end and a crank axle housing connected to the bottom end, the outer tube mounted in the bicycle frame, and wherein the coupler joins the inner tube and the outer tube such that movement of the inner tube, the seat post and the crank axle housing is damped relative to the frame proper and such that the seat post and the crank axle housing maintain a constant spacial relationship and move as a unit, further comprising a transition tube positioned around the seat post and connected the top end of the inner tube for securing the seat post to the inner tube, and a main bracket connected to and positioned around the outer tube, and wherein the coupler comprises a first coupler having a first end and a second end, the first coupler connected to the transition tube at the first end and to the main bracket at the second end.

6. The apparatus of claim 5, wherein the first coupler is an air cylinder, the air cylinder having an upper portion connected to the transition tube and a lower portion connected to the main bracket.

7. The apparatus of claim 6, further comprising a lock positioned in the air cylinder for selectively preventing translation of the inner tube within the outer tube.

8. The apparatus of claim 6, further comprising a clamp, the clamp having a clamping pin connected to the transition tube and a clamp lever mounted to the clamping pin.

9. The apparatus of claim 6, further comprising a collapsible dust boot positioned around the inner tube where the inner tube emerges from the outer tube.

10. The apparatus of claim 9, further comprising a clamp band positioned around a lower end of the transition tube for holding the dust boot.

11. The apparatus of claim 5, further comprising a clamping pin integral with a first coupler connection for securing the seat post inside of the transition tube.

12. The apparatus of claim 5, wherein the transition tube extends into the top end of the inner tube.

13. An energy-absorbing bicycle apparatus comprising a bicycle frame, a telescoping portion, and at least one coupler, the telescoping portion further comprising an outer tube, an inner tube housed inside and coupled to the outer tube, the inner tube having a top end and a bottom end, a seat post connected to the top end, and a crank axle housing connected to the bottom end, a transition tube positioned around the seat post and connected to the top end of the inner tube for securing the seat post to the inner tube, the outer tube mounted in the bicycle frame, a main bracket connected to and positioned around an upper part of the outer tube, and wherein the coupler comprises a first coupler having a first end and a second end, the first coupler being connected to the transition tube at the first end and to the main bracket at the second end, a first collapsible dust boot positioned around the inner tube at the top end where the inner tube emerges from the outer tube, a second collapsible dust boot positioned around the inner tube at the bottom end where the inner tube emerges from the outer tube.

14. The apparatus of claim 13, further comprising a second coupler having an upper end and a lower end, the second coupler being connected to the outer tube at the upper end and to the inner tube at the lower end.

15. The apparatus of claim 13, wherein the inner tube and the outer tube have cross-sectional shapes that prevent rotation of the inner tube and the outer tube relative to each other.

16. The apparatus of claim 13, further comprising an elastomer interposed between the inner and outer tube.

17. An energy-absorbing bicycle apparatus comprising a bicycle frame, a front tire, a rear tire, handlebars, a telescoping portion and at least one resilient coupler, the telescoping portion further comprising an outer tube, an inner tube housed inside and coupled to the outer tube, the inner tube having a top end and a bottom end, a seat post connected to the top end and a crank axle housing connected to the bottom end, the outer tube mounted in the bicycle frame, the coupler joins the inner tube and the outer tube such that movement of the inner tube, the seat post and the crank axle housing is damped by the frame and such that the seat post and the crank axle housing maintain a constant spacial relationship and move as a unit, the bicycle frame has a rear extension connected to the outer tube, a forward extension connected to the outer tube, a head tube connected to the forward extension, a front tire fork extending downward from the head tube, and wherein the front tire is connected to the front tire fork, the rear tire is connected to the rear extension, and the handlebars extend upward from the head tube, wherein the coupler further comprises an air cylinder, the air cylinder having an upper portion and a lower portion, the upper portion connected to the inner tube and the lower portion connected to the outer tube.

* * * * *

UNITED STATES PATENT AND TRADEMARK OFFICE
CERTIFICATE OF CORRECTION

PATENT NO. : 5,553,880

DATED : Sept. 10, 1996

INVENTOR(S) : Mark P. McJunkin, et al

It is certified that error appears in the above-identified patent and that said Letters Patent is hereby corrected as shown below:

The Title page, should be deleted to be replaced with the attached title page.

The drawing sheets, consisting of Figs. 1 - 24, should be deleted to be replaced with the drawing sheets, consisting of Figs. 1 - 24, as shown on the attached pages.

On the title page, under item [76], change "3846 Ridge Ave., Macon, Ga. 31204" to --2943 Hollywood Drive, Decatur, Ga. 30033--.

Signed and Sealed this

Fourth Day of February, 1997

Attest:

BRUCE LEHMAN

Attesting Officer

Commissioner of Patents and Trademarks

United States Patent [19]

McJunkin et al.

[11] Patent Number: 5,553,880

[45] Date of Patent: Sep. 10, 1996

[54] ENERGY-ABSORBER FOR A BICYCLE FRAME

[76] Inventors: Mark P. McJunkin, 3846 Ridge Ave., Macon, Ga. 31204; H. P. McJunkin, Jr., 862 Alta Rd., Charleston, W. Va. 25314

[21] Appl. No.: 354,050

[22] Filed: Dec. 6, 1994

[51] Int. Cl.⁶ ................................................ B62K 3/02
[52] U.S. Cl. ...................... 280/283; 280/227; 280/275; 280/226.1; 267/131
[58] Field of Search ........................... 280/283, 287, 280/220, 275, 278, 226.1, 227; 267/131, 132, 133; 248/601, 623, 622, 631, 600, 578, 561; 297/211, 195.1, 209, 215.13, 344.19, 344.20

[56] References Cited

U.S. PATENT DOCUMENTS

| | | | |
|---|---|---|---|
| 461,191 | 10/1891 | Latta | 280/227 |
| 578,326 | 3/1897 | Fox | 280/227 |
| 584,944 | 6/1897 | Little | |
| 589,328 | 8/1897 | Barton | 280/227 |
| 602,354 | 4/1898 | Ohlgart | 280/227 |
| 612,337 | 10/1898 | Hall | 280/227 |
| 635,964 | 10/1899 | Horn | 280/227 |
| 636,726 | 11/1899 | Hindmarsh | |
| 677,079 | 6/1901 | Pierce et al. | 280/227 |
| 724,630 | 4/1903 | Tramburg | 280/227 |
| 988,181 | 3/1911 | Escalante et al. | |
| 1,573,849 | 2/1926 | Nagot | 280/227 |
| 2,623,573 | 5/1951 | Gaetano | |
| 2,856,982 | 10/1958 | Leja | |
| 4,807,855 | 2/1989 | Schuttema | 267/64.12 |
| 5,024,412 | 6/1991 | Papp | |
| 5,094,424 | 3/1992 | Hartway | 280/283 |
| 5,158,268 | 10/1992 | Schnitzius et al. | 188/300 |
| 5,320,375 | 6/1994 | Reeves et al. | 188/319 |
| 5,324,059 | 6/1994 | Bryne | 280/283 |
| 5,326,119 | 7/1994 | Ganoung | 280/275 |
| 5,382,039 | 1/1995 | Hawker | 297/344.2 |
| 5,383,705 | 1/1995 | Voigt | 248/622 |

OTHER PUBLICATIONS

1995 Cannondale Bicycle Catalog.

*Primary Examiner*—Douglas C. Butler
*Attorney, Agent, or Firm*—James Creighton Wray

[57] ABSTRACT

An energy-absorbing apparatus for a bicycle frame maintains critical spatial relationships by allowing the seat and the pedal assembly to move slightly, together as a unit, relative to the bicycle frame proper. A telescoping portion of the apparatus has an inner tube housed inside an outer tube. The inner tube has a seat post connected to its top end and a pedal crank axle housing connected to the bottom end. The outer tube is in a fixed, integral relationship with the other frame members. Any of a number of combinations and variations of adjustable spring/damper means isolate the inner tube from the outer tube. Numerous features, including dust boots and a rider-activated keyway lock, can be incorporated into the frame design. The telescoping design reduces impact forces without causing undesirable changes in frame geometry or undesirable changes in the distance between the seat and pedals. The energy absorbing bicycle frame reduces rider fatigue and increases rider control and comfort by allowing controlled movement of the seat and pedals up and down as a unit.

17 Claims, 5 Drawing Sheets